United States Patent
Erikson

(10) Patent No.: US 6,700,833 B2
(45) Date of Patent: Mar. 2, 2004

(54) ACOUSTICAL IMAGING INTERFEROMETER FOR DETECTION OF BURIED UNDERWATER OBJECTS

(75) Inventor: Kenneth R. Erikson, Henniker, NH (US)

(73) Assignee: BAE Systems Information and Electronic Systems Integration Inc, Nashua, NH (US)

( * ) Notice: Subject to any disclaimer, the term of this patent is extended or adjusted under 35 U.S.C. 154(b) by 0 days.

(21) Appl. No.: 10/219,169

(22) Filed: Aug. 14, 2002

(65) Prior Publication Data
US 2003/0053373 A1 Mar. 20, 2003

Related U.S. Application Data

(60) Provisional application No. 60/322,694, filed on Sep. 17, 2001.

(51) Int. Cl.[7] ............................................... G01S 15/89
(52) U.S. Cl. ........................... 367/88; 348/81; 367/131; 367/7
(58) Field of Search ........................ 367/11, 131, 87, 367/88, 7; 396/25; 348/81; 73/632, 633, 649, 627

(56) References Cited

U.S. PATENT DOCUMENTS

| | | | |
|---|---|---|---|
| 3,711,823 A | | 1/1973 | Green |
| 4,088,979 A | | 5/1978 | Jones et al. |
| 4,300,215 A | * | 11/1981 | Jones ........................ 367/11 |
| 4,922,467 A | | 5/1990 | Caulfield |
| 4,951,268 A | * | 8/1990 | Grall ........................ 367/88 |
| 4,991,149 A | | 2/1991 | Maccabee |
| 5,200,931 A | | 4/1993 | Kosalos et al. |
| 5,357,063 A | | 10/1994 | House et al. |
| 5,482,044 A | | 1/1996 | Lin et al. |
| 5,598,152 A | | 1/1997 | Scarzello et al. |
| 5,598,206 A | | 1/1997 | Bullis |
| 5,621,345 A | | 4/1997 | Lee et al. |
| 5,732,706 A | | 3/1998 | White et al. |
| 6,134,966 A | * | 10/2000 | Donskoy et al. ............. 73/579 |
| 6,159,149 A | | 12/2000 | Erikson et al. |
| 6,216,540 B1 | | 4/2001 | Nelson et al. |
| 6,325,757 B1 | | 12/2001 | Erikson et al. |
| 6,415,666 B1 | * | 7/2002 | Donskoy et al. ............. 367/87 |
| 6,438,071 B1 | | 8/2002 | Hansen et al. |

OTHER PUBLICATIONS

Hansen, R K., "An Acoustic Camera for 3D Underwater Imaging," Acoustic Sensing and Imaging, Mar. 29, 1993, Conference Publication No. 369, pp. 99–102.*

Jones, I. "High Resolution Underwater Acoustic Imaging," Oceans '99 MTS/IEEE. Riding the Crest into the 21st Century, Sep. 13, 1999–Sep. 16, 1999, Seattle, WA, USA, pp(s).: 1093–1097, vol. 3.*

(List continued on next page.)

Primary Examiner—Ian J. Lobo
(74) Attorney, Agent, or Firm—Maine & Asmus

(57) ABSTRACT

A method and system for underwater detection of fully or partially buried objects such as sea mines and underwater cables, consisting of a mobile underwater platform configured with a real-time, three dimensional acoustical camera with a downward directed field of view used as an imaging interferometer, coordinated with a high-intensity, low frequency acoustical transmitter directed as to disturb the loose particulate or elastic matter comprising the seafloor within the field of view of the camera. The images recorded by the camera display the relative motion of the seafloor material before and after an acoustical pulse, in contrast to the lesser or no motion of submerged solid objects. Distinguishing man-made from natural objects is aided by recognizing geometric shapes apparent within the varying image density, not common in nature.

22 Claims, 5 Drawing Sheets

OTHER PUBLICATIONS

Ashraf et al., "Underwater object recognition technique using ultrasonics," Oceans '94. 'Oceans Engineering for Today's Technology and Tomorrow's Preservation, Proceedings, vol. 1, Sep. 1994.*

Sabatier, James M. et al, "Laser–Doppler Based Acoustic–to–Seismic Detection of Buried Mines", SPIE Conference on Detection and Remediation Technologies for Mines and Minelike Targets IV, SPIE, vol. 3710, pp. 215–222, 1999.

Simpson, Harry J. et al, "Synthetic array measurements of acoustical waves propagating into a water–saturated sandy bottom for a smoothed and a roughened interface", J. Acoust. Soc. Am. 107 (5), Pt. 1, May 2000, pp. 2329–2337.

Malmberg, Roy Dale, "A Study of the Feasibility of Using a Buried Sonar Transducer to Echo–Locate Objects Buried in Sediment", Naval PostGraduate School, Monterey, CA, Sep. 1987.

Sschmidt, Henrik et al, "Physics of 3–D scattering from rippled seabeds and buried targets in shallow water", J. Acoust. Soc. Am. 105 (3), 1999.

Smith, Eric, "Measurement and localization of interface wave reflections from a buried target", J. Acoust. Soc. Am. 103 (5), Pt.1, May 1998, pp. 2333–2343.

Younis, Waheed A. et al, "Nondestructive imaging of shallow buried objects using acoustic computed tomography", J. Acoust. Soc. Am. 111 (5), Pt.1, May 2002, pp. 2117–2127.

Frazier, Catherine H. et al, "Acoustic imaging of objects buried in soil", J. Acoust. Soc. Am. 108 (1), Jul. 2000, pp. 147–156.

Powers, Jeffrey E. et al, "Ultrasound Phased Array Delay Lines Based on Quadrature Sampling Techniques", IEE Trans. On Sonics & Ultrasonics, vol. SU–27(6), pp. 287–294, Nov. 1980.

Donskoy, Dimitri et al, "Nonlinear seismo–acoustic land mine detection and discrimination", J. Acoust. Soc. Am. 111 (6), Jun. 2002, pp./ 2705–2714.

Lagstad et al, Real Time Sensor Fusion for Autonomous Underwater Imaging in 3D, Oceans '96. MTS/IEEE. Prospects for the $21^{st}$ Century. Conference Proceedings, pp. 1330–1335, Sep./1996.

PCT International Search Report dated Jun. 23, 2003 of International Application No. PCT/US02/25934 filed Aug. 14, 2002.

* cited by examiner

ACOUSTICAL IMAGING INTERFEROMETER FOR DETECTION OF BURIED UNDERWATER OBJECTS

This application relates and claims priority for all purposes to U.S. application Ser. No. 60/322694, filed Sep. 17, 2001.

FIELD OF THE INVENTION

The invention relates to acoustical imaging interferometers, and more particularly to passive/active hybrid methods and systems for acoustical imaging of buried underwater objects.

BACKGROUND OF THE INVENTION

Detection of buried objects, such as mines by any means is difficult. In a land environment, mines remaining from a war are a scourge in many countries of the world. In the underwater environment, sea mines can be equally devastating, denying coastal waters to fisherman and civilians.

In time of war, military operations are also impeded or denied by the presence of sea mines. Mines that are tethered below the water surface or are standing proud on the seafloor may often be detected by existing means or by systems in advanced development. Acoustical imaging methods are effective for tethered and proud mines even in very turbid littoral waters, where optical methods often fail. Low frequency sonar systems may also be employed and do not have the limitations of optical systems in turbid water. FIG. 1 provides a diagrammatic presentation of the relative turbidity versus resolution potential of conventional sonar, acoustical and optical imaging systems.

Many sea mines are designed to progressively bury themselves through the scouring action of water movement on the seafloor. Optical, sonar and conventional acoustical imaging systems are not effective for these mines. In addition, many sea mines are constructed of non-magnetic or non-metallic materials such as fiberglass composites and are virtually undetectable by electromagnetic means.

Partially or completely buried mines remain an exceptionally difficult detection problem, for which there has been no solution prior to this invention. Low frequency excitation of the surface of the ground together with surface displacement measurement is an approach that has produced promising laboratory results for land mines in an on-land environment.

SUMMARY OF THE INVENTION

It is a goal of the invention to provide improved methods and apparatus for detecting partially and fully buried objects on the seafloor, in particular man-made objects. It is another goal to use imaging techniques requiring no light. It is a further goal to employ three dimensional techniques that facilitate discriminating loose seafloor materials from larger, more solid objects partially or fully submerged or buried immediately beneath the seafloor, and determining the size and shape of an object.

It is also a goal to employ active techniques such as acoustical pulses to disturb the elastic seafloor materials to reveal by their relative non-motion, the presence of objects buried immediately below the seafloor. It is a yet further goal to use three dimensional acoustical imaging techniques to capture before and after images interspersed with at least one acoustical pulse applied so as to disturb and cause some detectable degree of movement of the elastic seafloor materials that will be evident in the after image.

To this end there is assembled on an underwater platform an acoustic transducer array camera with range-gated response that enables three dimensional volumetric images to be constructed from a series of closely spaced planar response images associated with an original transmitted echo pulse. The platform is positioned in proximity to the seafloor target area of interest. The camera is operated in coordination with another acoustical transducer which can apply a substantial, low frequency tone burst or single acoustical pulse to the seafloor so as to cause elastic seafloor material to move a detectable amount, but has little or no effect on objects of relatively higher elasticity or density compared to the seafloor material. Images taken before and after applying the seafloor pulse are compared for evidence of movement and non-movement, yielding a profile of the buried object. Recognizable shapes and sizes help the operator or a computer to discriminate between man-made and natural objects.

Other goals and objectives will be readily apparent to those skilled in the art from the description and figures that follow.

DESCRIPTION OF THE PREFERRED EMBODIMENT

The invention is susceptible of many embodiments. What follows is only a preferred embodiment, intended to be illustrative and not limiting of the scope of the invention and claims that follow.

Figure 1:
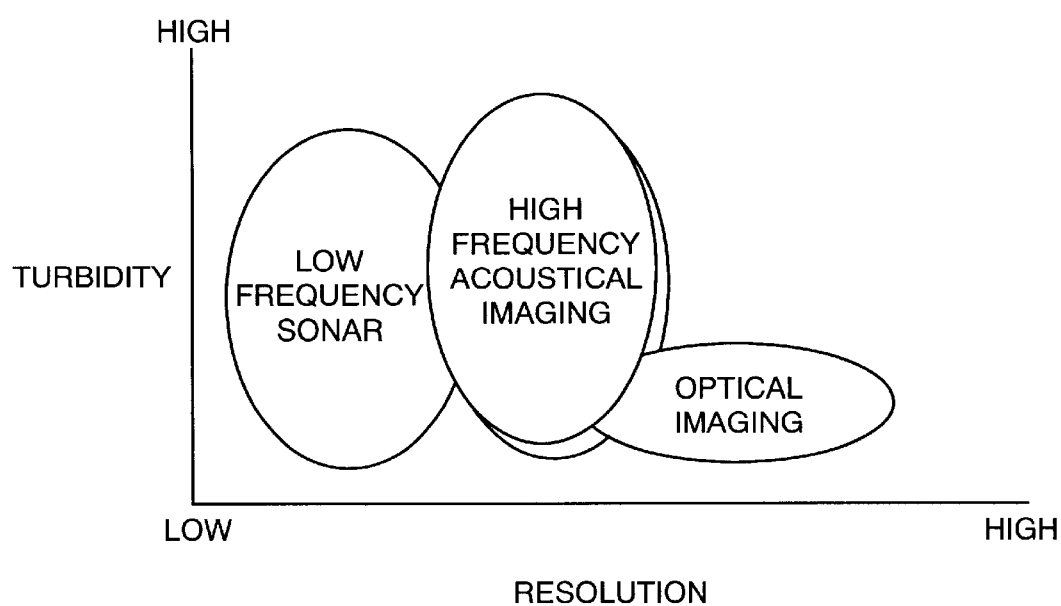
FIG. 1 is a graph of the relative imaging resolution of sonar, high frequency acoustical and optical systems in high turbidity water.
Figure 2:
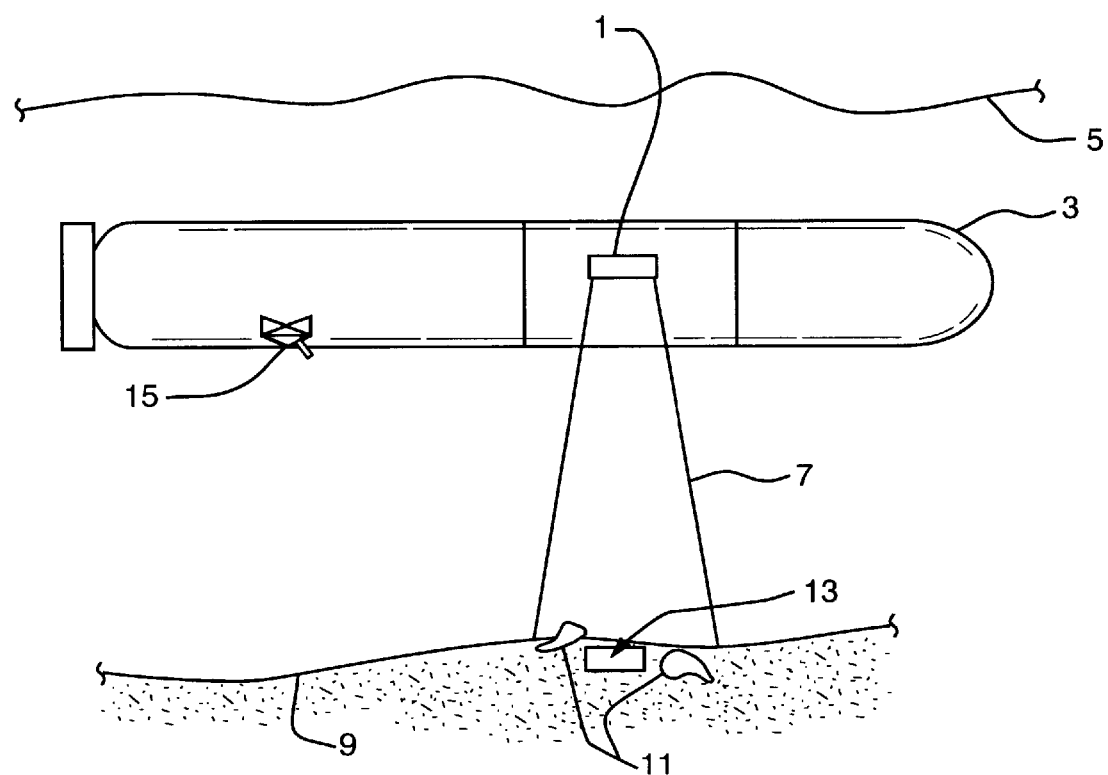
FIG. 2 is a diagrammatic depiction of a preferred embodiment of the invention, illustrating an acoustical camera and an acoustic pulse generator on an underwater platform.

FIG. 2 illustrates a preferred embodiment of the present invention for detecting buried objects immediately beneath the seafloor. The operation, simply stated, is as follows. An acoustical camera [1] is mounted in an underwater platform [3], which is laterally moving or movable under the sea surface [5] across the seafloor [9]. Acoustical camera [1], with downward directed field-of-view (FOV) [7], takes an image of the seafloor [9] which includes other objects such as rocks [11] on the seafloor within the FOV, using a mode that is highly sensitive to small changes in range on the order of fractions of the acoustical imaging wavelength. In this mode, the camera is operating as an imaging interferometer.

A low frequency acoustical transmitter [15], also mounted in vehicle [3] sends a high-intensity, low frequency toneburst or impulse to the seafloor towards the area of interest illuminated by FOV [7]. While this pulse is present in the camera FOV [7], a second image is taken by acoustical camera [1] in the same manner as the first. In regions where the seafloor consists of mud, silt or sand, and other loose material, the seafloor materials will be displaced by the low frequency pulse. Solid objects such as rocks [11] will experience minimal displacements in comparison to the seafloor. Buried objects [13] will influence the displacement of the seafloor, depending on their burial depth. By comparing the first and second images, the buried object may be detected. A more detailed explanation follows.

The acoustical camera [1] in the FIG. 2 embodiment of the invention is a 3 MHz ultrasonic underwater camera that operates without light either monostatically (in a pulse-echo mode) or bi-statically (with separate transmitter) to produce three dimensional (volumetric) images with from 5 to 16 feet range at a rate of 15 frames/second. The seven inch diameter acoustical lens [1.2] of camera [1] forms an image on a fully-populated, 128×128 array (16,384 channels) of piezocomposite, acoustical transducer elements. It is somewhat the acoustical equivalent of a video camera, using ultrasound instead of light.

Figure 3:
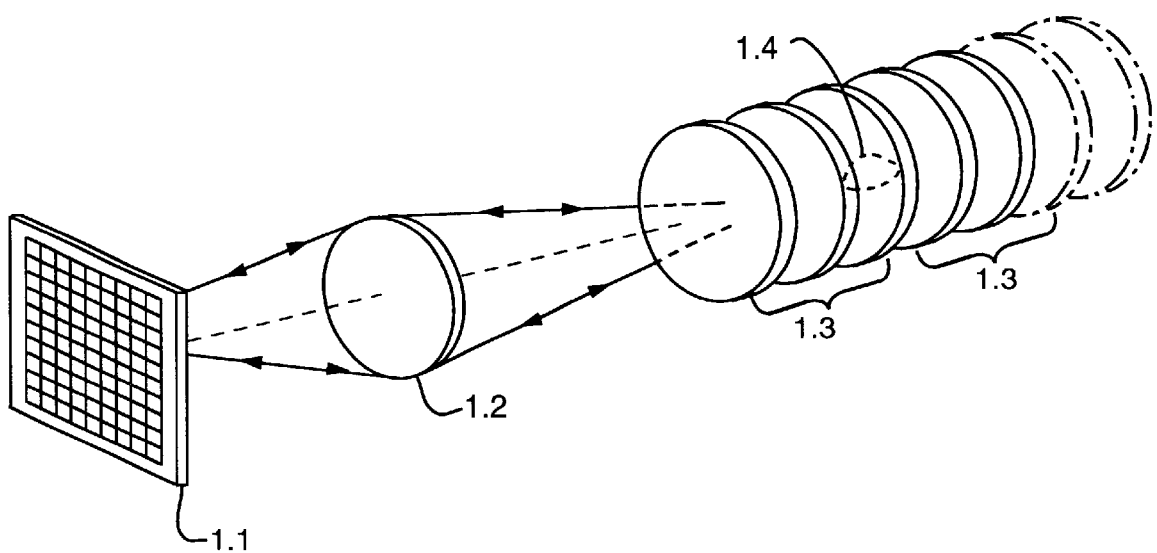
FIG. 3 is a perspective view of the array and lens component of the preferred embodiment camera, and the closely spaced planar images from which a three dimensional volumetric image containing an object, is constructed.

FIG. 3 describes the operation of camera [1]. A pulse of sound (ping), transmitted from the acoustical transmit/receive array [1.1] or an external transducer, is reflected from the target and is received by all array elements of array [1.1] simultaneously. Eight image planes [1.3] defining a first layer of the volume of interest in the vicinity of the seafloor are range-gated from this single pulse return, processed, stored and multiplexed out to external electronics. On the next pulse, the range gates are delayed to provide the next eight planes of data, a second layer just beyond and adjacent to the first layer. With only 10 pings, an entire 128×128×80 volume of information is received, corresponding to the volume of interest. Processing of the volume of information will enable a determination of the presence of buried object [1.4] in the volume of interest.

Unlike beamformed systems that receive and process data along single rays, the camera provides this volume image out to useful ranges at a real-time frame rate. At a 13 ft. range, for example, a 3 ft×3 ft×2.6 ft volume intersecting the plane of the seafloor is imaged with a resolution of a ½" (one half inch) cube at 15 frames per second. Applicant does not herein claim the technology inherent within existing camera [1], but rather adopts its capabilities to the system and methods of the invention. Table 1 provides the characteristics of camera [1].

TABLE 1

| CAPABILITY | PERFORMANCE |
|---|---|
| Acoustical Camera | |
| Frequency | 3 MHz (0.5 mm wavelength) |
| Range | >16 ft |
| xy Resolution | ½ in. @ 13 ft. |
| Field of View (FOV) | 14 degrees (3 ft × 3 ft @ 13 ft. range) |
| Pixel Count | 128 × 128 (16,384 simultaneous channels) |
| Number of range planes | 80 typical |
| Frame rate for 80 planes | 15 frames/sec |
| Imaging range resolution | <3 mm |

TABLE 1-continued

| CAPABILITY | PERFORMANCE |
|---|---|
| Interferometer mode resolution | <1/100 wavelength (0.005 mm) |
| Quadrature Sampling Rate | 12 MHz |

Figure 4:
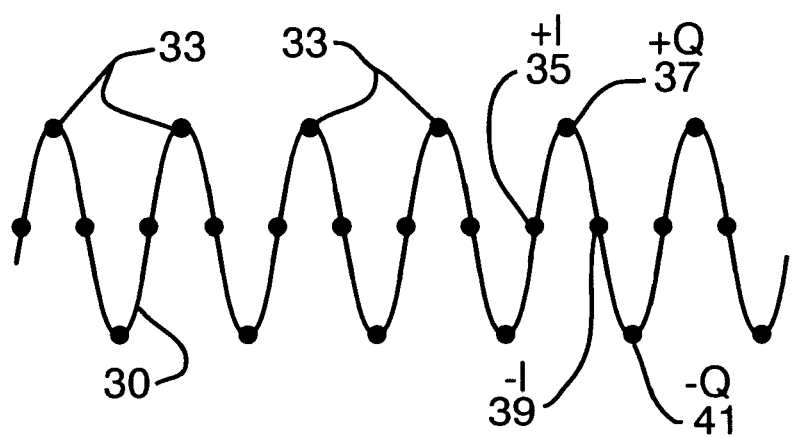
FIG. 4 is an illustration of real-time volumetric imaging response waveform at a single pixel of a two-dimensional acoustical transmit/receive array.

Referring to FIG. 4, in the preferred embodiment, in acoustical camera [1], the received echo waveform from an object is sampled at four times per cycle [33] (one wavelength), averaged over several cycles and recorded. These in-phase or I samples [35] and [39] and quadrature or Q samples [37] and [41] are separately and simultaneously sampled, averaged and recorded for each of the 16,384 pixels.

These samples may be converted to a magnitude and phase values for each echo through Equations (1) and (2).

$$\text{Magnitude}=\text{sqrt}\{(+I-(-I))^{\wedge}2+(+Q-(-Q)^{\wedge}2\} \qquad \text{Eq. 1}$$

$$\text{Phase}=\text{atan}\{(+Q-(-Q)/(+I-(-I)\} \qquad \text{Eq. 2}$$

Figure 5:
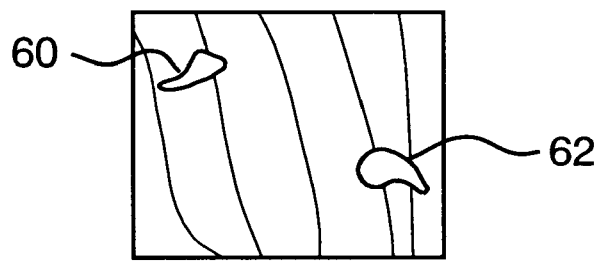
FIG. 5 is an illustration of a seafloor image made with the preferred embodiment system prior to application of an acoustic vibratory pulse.

In the acoustical camera, only the magnitude value is typically used to form an image. Three-dimensional information is preserved from the typical 80 planes by detecting the first plane in which there is an echo from the exterior surface of the object. The magnitude of the signal together with the plane in which it occurred is used by the image-rendering engine to form a pseudo-three dimensional image for display. Referring to FIG. 5, there is illustrated an image of the seafloor [64] before the application of a pulse, with surface objects [60] and [62] and contour lines present in the image.

Figure 6:
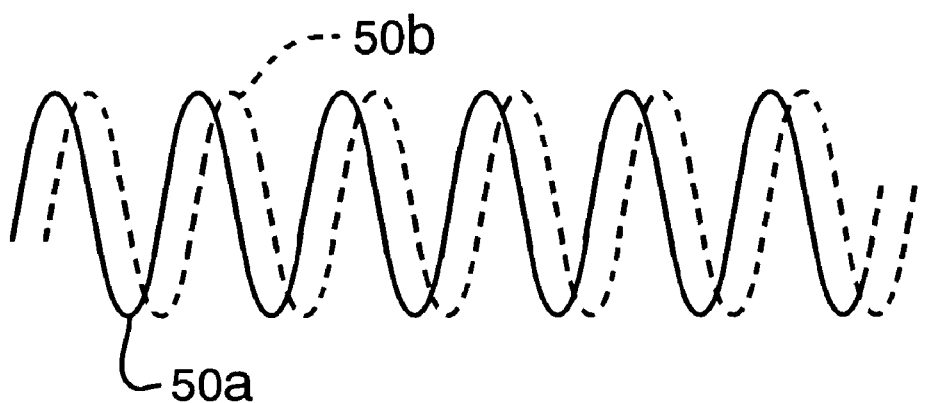
FIG. 6 is a comparison of waveforms at a single pixel resulting from displacement between a first image and second image.

Referring to FIG. 6, the interferometer mode of an acoustical camera uses waveform sampling to differentially measure displacement of objects by comparing the phase of the echo signal at each of the 16,384 pixels between sequential images [50A] and [50B]. In this sensitive detection mode, the camera is essentially operated as an interferometer. Using quadrature detection of an incident 3 MHz gated sinusoidal waveform, displacements on the order of 1/100 of an acoustical wavelength (0.005 mm) may be detected. Note that this displacement is the measured simultaneously and independently for each pixel in the image picture. Higher order or higher frequency sampling may be used in alternate embodiments to improve the accuracy of the phase measurements.

The displacement between images is provided by the high-intensity, low frequency toneburst from transmitter transducer [15] of FIG. 2. The acoustical frequency and intensity are selected to provide displacement of the seafloor sufficient for the imaging interferometer to detect the motion.

Figure 7:
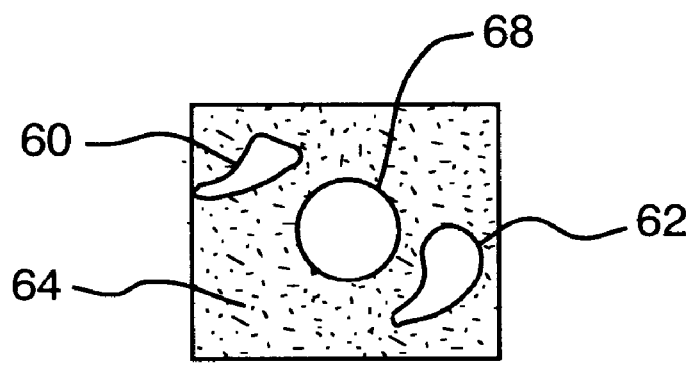
FIG. 7 is an illustration of the image obtained from the same seafloor target as FIG. 5, using sea floor perturbation by a high-intensity, low frequency acoustical wave to cause movement of loose seafloor material.

Referring to FIG. 7, comparison of pixels from first image [50A] and second image [50B] of FIG. 6 will show pixels that have had little or no displacement such as objects [60] and [62]; larger displacements due to the mobility of the water-saturated silt or sand seafloor [64] and intermediate displacement from around buried object [68] and the region surrounding partially buried rocks.

The buried objects could also be rocks, but man-made objects of importance generally have geometrical shapes, which pattern recognition techniques or human operators will readily discern.

The invention is susceptible of many enhancements and other embodiments. For example, there is within the scope of the invention a system for detecting objects under the seafloor, consisting of a mobile underwater platform that may be self-propelled, towed, or be otherwise transportable along and above the seafloor at a suitable distance for conducting the method of the invention.

There is an ultrasonic underwater camera with a field of view projecting downward, where the camera has a rapid frame rate and range gated response times for producing three dimensional volumetric images of a selected target area volume which at least partially includes the seafloor so as to capture objects on the surface of the seafloor as well as objects partially or buried immediately below the seafloor. An acoustic transducer is included for applying an acoustic pulse to the seafloor within the field of view. There is included a computer-based system for coordinating the camera and acoustic transducer operation for making a first volumetric image of the target area volume, applying an acoustic pulse to the seafloor within the target area volume, and making a second volumetric image of the target area volume just after applying the acoustic pulse.

There may be a computer based or manual means such as by human operators, for comparing the first and second images for evidence of movement of seafloor materials relative to the non-movement of objects detected between the first and second images. The computer-based means may use pattern recognition schemes or other comparative algorithms known or not yet developed, for resolving the differences between the images.

There may be a navigation system on board the platform or a related scheme associated with the operation of the detection system by which the geophysical coordinates or other location parameters of the target area and volume may be associated with the images. Time and date information may be included also. There may likewise be a wireless or cable means for transporting or transmitting the images to the sea surface or other land or airborne operations center, either with location parameters attached, or to be then associated with location parameters developed from other sources and made available at the surface. There may be computer based or other known image recording mechanisms for recording the images with or without their location, and time and date parameters.

There may also be included an acoustical transducer that is extendible from the platform towards the seafloor for applying an acoustical pulse at shorter range for greater effect on the loose seafloor materials within the target area, and thereafter be retractable for movement or transporting of the platform. There may also be a computer-based or operator monitoring capability for discriminating man-made from natural objects detected in the images, so that the man-made objects can be marked for immediate or later consideration.

The platform or at least the camera system may incorporate means such as a short range sonar system for detecting the distance from the camera to the seafloor in the field of view, and for either adjusting the actual height of the platform over the seafloor or adjusting the range of the camera to correctly place the image volume to include the target area. The acoustical camera may be a 3 MHz ultrasonic underwater camera configured for producing three-dimensional volumetric images at a 5 to 16 feet range at a rate of 15 frames/second. The camera may have an acoustical lens configured for forming an image on a fully-populated, 128×128 array of piezocomposite, acoustical transducer elements.

As another example of the invention, there is a variation on the system for detecting objects under the seafloor where the camera and transducers are coordinated for applying an acoustic pulse first to the seafloor within the target area volume, and the camera then making a volumetric image of the target area volume after applying the acoustic pulse. This sequence may be repeated.

The system may be incorporated with robotic or other means for physically contacting, extracting or otherwise operating on the detected objects to obtain additional information or to alter the state of a detected object in some fashion. Other sensors and actuators may be incorporated in the system for routine or exceptional use depending on the user's further objectives and requirements.

There are also methods within the scope of the invention, such as this method for detecting objects under the seafloor consisting of the steps of: positioning an ultrasonic underwater camera with its field of view projecting downward towards a selected target area volume at least partially including the seafloor, where the camera has a rapid frame rate and range gated response times for producing three dimensional volumetric images; positioning an acoustic transducer for applying an acoustic pulse to the seafloor within the field of view; making a first volumetric image of the target area volume with the camera; applying an acoustic pulse to the seafloor within the target area volume so as to vibrate the elastic seafloor materials; and making a second volumetric image of the target area volume.

The method may include the steps of comparing the first and second images for evidence of movement of seafloor materials relative to non-movement of objects between the first and second images and/or transporting or transmitting the images to the surface to a sea, land or airborne operations center, and for recording the images. There may be included the further step of discriminating man-made from natural objects, in particular cables, seafloor sensors, mines, and munitions of all kinds.

Even other embodiments and examples within the scope of the invention and the appended claims will be readily apparent to those skilled in the art from the description, figures, and abstract.

I claim:

1. A system for detecting objects under the seafloor comprising:

a mobile underwater platform;

an ultrasonic underwater camera with a field of view projecting downward, said camera having a frame rate and range gated response times for producing three dimensional volumetric images of a selected target area volume at least partially including said seafloor;

an acoustic transducer for applying an acoustic pulse to said seafloor within said field of view; and a computer for coordinating operation of said camera and said acoustic transducer, wherein a first volumetric image of said target area volume is produced by the ultrasonic underwater camera, and a second volumetric image of said target area volume is produced by the ultrasonic underwater camera after an acoustic pulse is applied to said seafloor within said target area volume.

2. A system for detecting objects under the seafloor according to claim 1, wherein said computer is further adapted to compare images for evidence of movement of seafloor materials relative to said objects.

3. A system for detecting objects under the seafloor according to claim 1, further comprising:

means for identifying the location of said target area volume.

4. A system for detecting objects under the seafloor according to claim 1, further comprising:

means for transporting said images to the surface.

5. A system for detecting objects under the seafloor according to claim 1, further comprising:
means for recording said images.

6. A system for detecting objects under the seafloor according to claim 1, wherein said acoustical transducer is extendible from said platform towards said seafloor.

7. A system for detecting objects under the seafloor according to claim 1, further comprising:
means for discriminating man-made from natural objects detected in said images.

8. A system for detecting objects under the seafloor according to claim 1, further comprising:
means for detecting a distance from said camera to said seafloor.

9. A system for detecting objects under the seafloor according to claim 1, wherein said camera is na 3 MHz ultrasonic underwater camera configured for producing said three dimensional volumetric images at a 5 to 16 feet range at a rate of 15 frames/second, said camera having an acoustical lens configured for forming an image on a fully-populated, 128×128 array of piezocomposite, acoustical transducer elements.

10. A system for detecting objects under the seafloor according to claim 1, wherein said camera is operating as an acoustical imaging interferometer configured with a resolution of less than one wavelength.

11. A system for detecting objects under the seafloor comprising:
a mobile underwater platform;
an ultrasonic underwater camera with a field of view projecting downward, said camera having a frame rate and range gated response times for producing three dimensional volumetric images of a selected target area volume at least partially including said seafloor;
an acoustic transducer for applying an acoustic pulse to vibrate said seafloor within said field of view; and
a computer for coordinating operation of said camera and said acoustic transducer wherein a volumetric image of said target area volume is produced after applying said acoustic pulse.

12. A system for detecting objects under the seafloor according to claim 11, wherein said camera is operating as an acoustical imaging interferometer configured with a resolution of less than one wavelength.

13. A method for detecting objects under the seafloor comprising:
positioning an ultrasonic underwater camera with its field of view projecting downward towards a selected target area volume at least partially including said seafloor, said camera having a frame rate and range gated response times for producing three dimensional volumetric images;
positioning an acoustic transducer for applying an acoustic pulse to said seafloor within said field of view;
producing a first volumetric image of said target area volume with said camera;
applying an acoustic pulse to vibrate said seafloor within said target area volume; and producing a second volumetric image of said target area volume.

14. A method for detecting objects under the seafloor according to claim 13, further comprising:
comparing images for evidence of movement of seafloor materials relative to objects partially or fully submerged beneath said seafloor.

15. A method for detecting objects under the seafloor according to claim 13, further comprising:
transporting said images to the surface.

16. A method for detecting objects under the seafloor according to claim 13, further comprising:
recording said images.

17. A method for detecting objects under the seafloor according to claim 13, further comprising:
discriminating man-made from natural objects detected in said images.

18. A method for detecting objects under the seafloor according claim 13, wherein said producing includes producing said volumetric images at a 5 to 16 feet range at a rate of 15 frames/second.

19. A method for detecting objects under the seafloor according to claim 13, wherein said camera is operating as an acoustical imaging interferometer configured with a resolution of less than one wavelength.

20. A system for detecting objects wider the seafloor comprising:
a mobile underwater platform;
an ultrasonic underwater camera with a field of view projecting downward, said camera having a frame rate and range gated response times for producing three dimensional volumetric images of a selected target area volume at least partially including said seafloor;
an acoustic transducer for applying an acoustic pulse to said seafloor within said field of view;
a computer means for coordinating said camera and said acoustic transducer for producing a first volumetric image of said target area volume, and producing a second said volumetric image of said target area volume after applying said acoustic pulse; and
a means for comparing said first and second images for evidence of movement of seafloor materials relative to objects partially or fully submerged beneath said seafloor.

21. A system for detecting objects under the seafloor according to claim 20, further comprising:
means for discriminating man-made from natural objects detected in said images.

22. A system for detecting objects under the seafloor according to claim 20, wherein said camera is a 3 MHz ultrasonic underwater camera configured for producing said volumetric images at a 5 to 16 feet range at a rate of 15 frames/second.

* * * * *